United States Patent
Ramsay

(10) Patent No.: US 9,533,276 B2
(45) Date of Patent: Jan. 3, 2017

(54) POLYMERIZATION PROCESS IN WHICH INERT GAS SUPPLY IS CONTROLLED ACCORDING TO RANKING

(71) Applicant: Ineos Europe AG, Vaud (CH)

(72) Inventor: Kevin Peter Ramsay, West Lothian (GB)

(73) Assignee: INEOS EUROPE AG, Vaud (CH)

(*) Notice: Subject to any disclaimer, the term of this patent is extended or adjusted under 35 U.S.C. 154(b) by 140 days.

(21) Appl. No.: 14/368,088

(22) PCT Filed: Dec. 20, 2012

(86) PCT No.: PCT/EP2012/076331
§ 371 (c)(1),
(2) Date: Jun. 23, 2014

(87) PCT Pub. No.: WO2013/098179
PCT Pub. Date: Jul. 4, 2013

(65) Prior Publication Data
US 2014/0371407 A1 Dec. 18, 2014

(30) Foreign Application Priority Data

Dec. 28, 2011 (EP) ..................................... 11195898

(51) Int. Cl.
C08F 2/00 (2006.01)
C08F 110/02 (2006.01)
B01J 8/18 (2006.01)
C08F 10/00 (2006.01)
B01J 8/24 (2006.01)

(52) U.S. Cl.
CPC .............. B01J 8/1809 (2013.01); C08F 10/00 (2013.01); C08F 110/02 (2013.01); C08F 2400/02 (2013.01)

(58) Field of Classification Search
CPC ........ C08F 2/00; C08F 2400/02; B01J 8/1809; B01J 2219/00259
USPC .............. 526/89, 236, 78; 422/105; 528/484
See application file for complete search history.

(56) References Cited

U.S. PATENT DOCUMENTS

| 4,855,370 A | 8/1989 | Chirillo et al. |
| 5,376,742 A | 12/1994 | Krause |

FOREIGN PATENT DOCUMENTS

| WO | WO 01/49751 A1 | 7/2001 |
| WO | WO 03/103863 A1 | 12/2003 |
| WO | WO 2008/024517 A2 | 2/2008 |
| WO | WO 2008/024517 A3 | 2/2008 |
| WO | WO 2010/023748 A1 | 10/2010 |

OTHER PUBLICATIONS

Lee's Loss Prevention in the Process Industries, Hazard Identification, Assessment and Control, vol. 1, Third edition, Dr. Sam Mannan, PE, CSP, Department of Chemical Engineering, Texas A&M University, Texas, USA, 10 pgs (2005).
Process Utility Systems, Introduction to Design, Operation and Maintenance, Chapter 5, "Inert Gases"; Institution of Chemical Engineers, Edited by Jack Broughton, 21 pgs (1994).

Primary Examiner — Fred M Teskin
(74) Attorney, Agent, or Firm — Nixon & Vanderhye P.C.

(57) ABSTRACT

Polymerization process having a plurality of processing steps in which an inert gas is used or is provided as a back-up, each of the processing steps being assigned a ranking based on the requirement for an inert gas flow in the processing step. The process, in the event of a process upset, controls with a control system the supply of available inert gas based on the rankings.

17 Claims, No Drawings

POLYMERIZATION PROCESS IN WHICH INERT GAS SUPPLY IS CONTROLLED ACCORDING TO RANKING

This application is the U.S. national phase of International Application No. PCT/EP2012/076331 filed 20 Dec. 2012 which designated the U.S. and claims priority to European Patent Application No. 11195898.9 filed 28 Dec. 2011, the entire contents of each of which are hereby incorporated by reference.

BACKGROUND OF THE INVENTION

The present invention relates to a polymerisation process.

The production of polymer powder by polymerisation reactions of monomers in the presence of catalysts is well-known. For example, processes are known and widely operated commercially using both fluidised bed reactors and slurry phase reactors.

In the gas fluidised bed polymerisation of olefins the polymerisation is conducted in a fluidised bed reactor wherein a bed of polymer particles is maintained in a fluidised state by means of an ascending gas stream comprising the gaseous reaction monomer. During the course of polymerisation, fresh polymer is generated by the catalytic polymerisation of the monomer, and polymer product is withdrawn to maintain the bed at more or less constant volume. An industrially favoured process employs a fluidisation grid to distribute the fluidising gas to the bed, and to act as a support for the bed when the supply of gas is cut off. The polymer produced is generally withdrawn from the reactor via a discharge conduit arranged in the lower portion of the reactor, near the fluidisation grid.

In a slurry polymerisation process the polymerisation is conducted in a stirred tank or, preferably, a continuous loop reactor comprising mainly polyolefin, hydrocarbon diluent and a catalyst for the polymerisation. Polymer product is removed from the reactor in the form of a slurry in the diluent.

Inert gases, and in particular nitrogen, can be used or provided for a number of purposes in the overall polymerisation process. Some of these uses occur during normal operation, whereas others are used during start-ups or shut-downs, or during process upsets.

For example, a potentially large requirement for inert gas can be found in downstream processing. In particular, the polymer product removed from the reactor in a polymerisation process may contain unreacted monomers and other hydrocarbon species (for example, hydrogen, methane, ethane, propane, butane, pentane, hexane) and these monomers and other hydrocarbons should be removed from the polymer product since failure to do so may lead to (a) hydrocarbons levels rising to explosive levels in downstream equipment or (b) environmental constraints being exceeded or (c) unacceptable product quality e.g. odours.

The removal of monomer and other residual hydrocarbons, which may be in gaseous or liquid form, is generally referred to as "degassing". One method that may be used is to contact the produced polymer with a gas in a purge vessel, usually a counter-currently flowing gas. The gas can be an inert gas, in particular nitrogen, although it is also known to use reaction gases, and is generally referred to as "purging".

Further, the polymer, even after degassing, can still contain residual levels of hydrocarbons, and for this reason downstream storage silos are also often provided with a purge using an inert gas to prevent build-up of such hydrocarbons in the silos.

A further example of a requirement for inert gas can be found in purging of feed treatment vessels. In particular, feeds to the process, such as fresh monomers, are generally passed through one or more treatment vessels comprising treatment beds to remove undesired components which might otherwise adversely influence the polymerisation process, for example by acting to poison the polymerisation catalyst. The treatment beds must be periodically treated to remove the undesired components, a process known as regeneration. Regeneration generally involves stopping passage of the fluid to be treated e.g. monomer, to the treatment vessel. The treatment bed is then usually depressurised and purged with an inert gas flow, generally heated, to remove the undesired components. Such processes are described generally in WO 2010/123748.

As further examples, inert gases may be used to purge valves, seals and filters to keep them free of fouling.

Inert gases, such as nitrogen even if not normally used, are also often provided as a back-up in case of a process upset. For example, in the event of a process upset nitrogen may be used to flush the reactor or other parts of the apparatus of reactive gases. This can include use of nitrogen in purge vessels where nitrogen is not otherwise typically used as the purge gas.

It can be seen from the above that inert gases may be used for a number of different steps in a polymerisation process, in particular in the downstream processing.

As a result of all of the above uses and, in particular the large number of potential uses of inert gas in the event of process upsets, it is necessary to provide a large inert gas capacity for the event it is required, but which inert gas capacity is normally not used. This can result in a large cost to the build and operation of a polymerisation plant, a cost which increases as the plant capacity increases.

DESCRIPTION OF THE INVENTION

The Applicant has now found that the inert gas capacity that needs to be provided for a polymerisation process can be reduced by prioritising the use of inert gas in the event of a process upset.

Thus, in a first embodiment the present invention a polymerisation process comprising a plurality of processing steps in which an inert gas is used or is provided as a back-up, each of said processing steps being assigned a ranking based on the requirement for an inert gas flow in the processing step, said polymerisation process being characterised in that in the event of a loss of normal operating conditions the control system controls the supply of the available inert gas based on said rankings.

The present invention prioritises the use of inert gas based on the requirement for the inert gas flow in processing steps in the event of a system upset.

In particular, if the overall demand for inert gas exceeds the inert gas available then the control system allocates the available inert gas to the processing steps of "higher" ranking at the expense of those of "lower" ranking.

The requirement for an inert gas flow in a processing step is generally based on the consequence of a loss of the inert gas flow is said step. For example, the consequence may be an unsafe or potentially unsafe condition, or may be an economic loss. In some steps the loss of inert gas flow may have no or only a very limited consequence. It will be clear that processing steps where the consequence may be an unsafe or potentially unsafe condition should be highly ranked, whereas processing steps with limited or no consequence will generally be lowly ranked.

For example, in the event of a process upset, inert gas may be switched from use in processing steps where no or only minor safety implications arise in the absence of inert gas to ensure adequate supply in processing steps where it is required to ensure safe operation. Examples of processing steps where no or only minor safety implications exist, and which therefore might be expected to have lower ranking, might include the purging of seals or valves, or the use of inert gas in catalyst preparations, such as catalyst activation vessels.

It is possible to stop inert gas flow to lower ranked processing steps, or it may be that flows can be reduced either permanently or temporarily in certain processing steps to free up inert gas for use elsewhere. For example, although storage silos usually maintain a flow of inert gas to prevent hydrocarbon build-up, it is possible to reduce this flow and allow a higher equilibrium level of hydrocarbon to build-up without significant safety implication, which hydrocarbon level can be reduced again by increasing flow once the other demands for inert gas have reduced.

Another example of process steps which may be relatively lowly ranked in the process of the present invention are feed treatment steps. Regeneration of feed treatment systems generally involves quite a significant inert gas flow, but it has been found that this can be stopped if insufficient nitrogen is available, and restarted when sufficient is available again.

The exact manner in which the processing steps are ranked is not especially critical to the process of the present invention, although clearly processing steps which require inert gas flow should be distinguishable from those that don't.

At its most basic level the ranking may comprise simply such a two level distinction, i.e. each processing step is assigned to one of two rankings, one ranking identifying those steps which require inert gas flow and the other ranking identifying those that don't.

More preferably, the rankings will distinguish steps which require inert gas, steps where it is preferred that inert gas is provided if available, and steps which can be easily operated without inert gas.

The intermediate ranking, for example, may apply to processing steps which do not need inert gas to maintain safe operations, but where the absence of an inert gas can cause other processing implications. For example, if polymer powder in certain transfer vessels is not purged with inert gas there may be no direct safety implication, but the polymer may agglomerate and the vessel may require significant downtime whilst it is cleaned before it can be reused. If catalyst activation vessels suddenly lose their inert gas (for example in a fluidised bed calciner) there may be no safety implication, but the catalyst batch may be affected.

Whilst the above illustrates relatively simple examples to explain the principles, the rankings can be significantly more sophisticated. For example, it could be that every processing step is ranked in order relative to every other processing step e.g. if there were 50 such steps, they would be ranked 1 to 50 or similar.

It is also possible that the ranking, or relative ranking, of a processing step may change over time. For example, if one processing step requires an immediate but relatively short-lived flow of inert gas in the event of a process upset it may be that this has a high ranking initially, but the ranking is reduced subsequently (once the consequence of operation without a flow of inert gas has receded). Such a processing step could be linked to a processing step which has a complimentary requirement, namely can operate with little consequence (or relatively low ranking) initially, but could result in a more significant consequence if inert gas is absent for an extended period. A storage silo may be a good example of the latter type of processing step.

The advantage of more sophisticated systems of ranking is that the inert gas capacity required can be reduced further still.

The term "inert gas capacity" as used herein refers to the amount of inert gas which must be available to the process per unit time, and corresponds to the maximum amount of inert gas per unit time required to feed all processing steps to which the control system wishes to supply the available inert gas in any scenario. This is based on the processing steps which require inert gas, which is itself based on the rankings.

For example, with the basic "two-level" ranking system, the inert gas capacity required is simply related to the maximum of the inert gas flow required for the steps identified as requiring inert gas during a process upset and the inert gas flow in normal operation.

Where inert gas is obtained from a fixed volume resource, such as a liquid nitrogen tank, the minimum volume of such a resource which must be maintained can be reduced in the present invention. Firstly this is because the inert gas capacity (i.e. the maximum amount that might be required per unit time) is reduced. Further, where more sophisticated systems are used it is possible to analyse the absolute inert gas requirements (total volume) in various scenarios i.e. it may not be necessary to maintain a flow corresponding to the inert gas capacity at all times during an upset.

By using the process of the present invention it has been found that the nitrogen capacity which needs to be installed can be reduced to less than 80% of the nominal inert gas capacity. (The "nominal inert gas capacity" as used herein is the inert gas capacity which would be required if all processing steps asked for inert gas simultaneously). By the use of more sophisticated ranking systems the nitrogen capacity required can be reduced to less than 70%, preferably less than 60% and most preferably less than 50% of the nominal capacity.

The present invention is applicable to any suitable polymerisation process including gas, slurry and solution phase processes.

Preferably, the process is a process for the production of polyethylene or polypropylene by polymerisation of ethylene or propylene respectively with one or more comonomers, most preferably comonomers having 4 or more carbon atoms.

An example of a gas phase polymerisation process in a horizontally disposed reactor vessel can be found in U.S. Pat. No. 4,921,919. Preferred gas phase processes are fluidised bed gas phase processes in vertically orientated reactors, such as described in U.S. Pat. No. 5,376,742.

An example of a suitable slurry process is that found in WO 2008/024517.

The inert gas can in theory be any inert gas, but for cost and practical purposes is most preferably nitrogen.

There may also be separate supply systems for supply of different "types" of inert gas to parts of the polymerisation process. For example, certain parts of a polymerisation process may require higher purity nitrogen and other parts of the process may require "regular purity" nitrogen. In such a scenario there may be control systems which separately control supply of "regular purity" nitrogen and "high purity" nitrogen, in which case the process of the present invention can be applied to either system or separately to both systems. Alternatively, at least in an emergency situation, one or more of any different types of inert gas may be available for use by other inert gas systems e.g. spare high purity nitrogen capacity can be used in a "regular purity" nitrogen system.

In a second embodiment, the present invention also provides a process for controlling the supply of inert gas to one or more processing steps of a polymerisation process in the event of a loss of normal operating conditions, said process being characterised in that the supply of available inert gas to the processing steps is controlled based on the requirement for an inert gas flow in each processing step.

The preferred features of this second embodiment are generally as described already for the first embodiment. For example, each of said processing steps is generally assigned a ranking based on the requirement for an inert gas flow in the processing step in the event of a loss of normal operating conditions, and the supply of available inert gas can then be controlled based on said rankings.

In yet a further, third, embodiment, the present invention provides a process control system for a polymerisation process, said polymerisation process comprising a plurality of processing steps in which an inert gas is used or is provided as a back-up, said process control system being characterised in that each of said processing steps is assigned a ranking based on the requirement for an inert gas flow in the processing step in the event of a loss of normal operating conditions, and the process control system controls the supply of the available inert gas to the processing steps based on said rankings.

The preferred features of this third embodiment are again generally as described already for the first embodiment.

The present invention will be illustrated by reference to the following example:

EXAMPLE

The following example is based on a gas phase fluidised bed process producing 50 Te/hr of polyethylene product.

The process is provided with separate supplies of "regular" and high purity nitrogen, which are used in various parts of the process.

Under "normal" operation the requirements are approximately 100 Nm$^3$/hr of high purity nitrogen and approximately 2000 Nm$^3$/hr of regular nitrogen ("regular" referring to regular purity rather than high purity).

For the high purity nitrogen approximately 20 Nm$^3$/hr is provided to the catalyst injection system as a carrier gas for the catalyst. This is "prioritised" to ensure supply during a process upset, although as this is also used in normal operation the flow does not need to be diverted from anywhere else to meet this requirement.

For the "regular" nitrogen, the following 3 requirements for nitrogen are prioritised:

1) A nitrogen flush for the catalyst injection nozzles,
2) A nitrogen flush as seal gas to the process compressors, and
3) A nitrogen flow to the process loop.

Of the above, (1) and (2) are emergency flushes which are not used during normal operation. These two lead to an additional demand of in excess of 1000 Nm$^3$/h of regular nitrogen in the event of an upset.

Prior to the present invention the regular nitrogen capacity available was sized to ensure a total amount of regular nitrogen sufficient to meet this additional demand and the "normal" demand requirements. In the above this would mean a "nominal inert gas capacity" of the regular nitrogen sufficient to meet a demand of in excess of 3000 Nm$^3$/hr.

According to the process of the present invention a reduced capacity can be provided, and regular nitrogen diverted from non-prioritised parts of the process to meet the additional requirement.

In this case the maximum inert gas requirement for the regular nitrogen corresponds to the "normal" operation. This less than ⅔rds of the nominal capacity noted above.

The invention claimed is:

1. A polymerisation process comprising a plurality of processing steps in which an inert gas is used or is provided as a back-up, each of said processing steps being assigned a ranking based on the requirement for an inert gas flow in the processing step,
said polymerisation process in the event of a process upset, comprising controlling with a control system the supply of available inert gas based on said rankings.

2. A process according to claim 1 wherein processing steps where the consequence of a loss of the inert gas flow in said step is an unsafe condition are relatively highly ranked.

3. A process according to claim 1 wherein in the event of a process upset the control system allocates the available inert gas to the processing steps of higher ranking at the expense of those of lower ranking.

4. A process according to claim 3 where the processing steps of lower ranking include the purging of seals or valves and/or the use of inert gas in catalyst preparations.

5. A process according to claim 4 where the processing steps of lower ranking include the use of inert gas in catalyst activation vessels.

6. A process according to claim 1 wherein flow of inert gas is reduced in certain processing steps to free up inert gas capacity for use elsewhere.

7. A process according to claim 6 where the flow of inert gas is reduced to storage silos.

8. A process according to claim 1 wherein the ranking, or relative ranking, of one or more of the processing steps changes over time.

9. A process according to claim 8 wherein a processing step has a high ranking initially, but the ranking is reduced subsequently.

10. A process according to claim 1 wherein a nitrogen capacity is installed which is reduced to less than 80% of the nominal inert gas capacity.

11. A process according to claim 10 wherein the nitrogen capacity which is installed is reduced to less than 70% of the nominal inert gas capacity.

12. A process according to claim 10 wherein the nitrogen capacity which is installed is reduced to less than 60% of the nominal inert gas capacity.

13. A process according to claim 10 wherein the nitrogen capacity which is installed is reduced to less than 50% of the nominal inert gas capacity.

14. A process according to claim 1 wherein there are separate inert gas systems for supply of different types of inert gas to parts of the polymerisation process, and, at least in an emergency situation, one or more of any different types of inert gas may be available for use by another inert gas system.

15. A process for controlling the supply of inert gas to one or more processing steps of a polymerisation process in the event of a process upset, said process comprising controlling the supply of available inert gas to the processing steps based on the requirement for an inert gas flow in each processing step.

16. A process according to claim 15 wherein each of said processing steps is assigned a ranking based on the requirement for an inert gas flow in the processing step in the event of a process upset, and the supply of available inert gas is controlled based on said rankings.

17. A process control system for a polymerisation process, said polymerisation process comprising a plurality of processing steps in which an inert gas is used or is provided as a back-up, said process control system being comprised such that each of said processing steps is assigned a ranking based on the requirement for an inert gas flow in the processing step in the event of a process upset, and the process control system controls the supply of the available inert gas to the processing steps based on said rankings.

* * * * *